United States Patent
Mamiya et al.

(10) Patent No.: US 7,245,387 B2
(45) Date of Patent: *Jul. 17, 2007

(54) THREE-DIMENSIONAL MEASURING INSTRUMENT

(75) Inventors: Takahiro Mamiya, Komaki (JP); Ikuo Futamura, Komaki (JP)

(73) Assignee: CKD Corporation, Aichi (JP)

( * ) Notice: Subject to any disclaimer, the term of this patent is extended or adjusted under 35 U.S.C. 154(b) by 355 days.

This patent is subject to a terminal disclaimer.

(21) Appl. No.: 10/505,648

(22) PCT Filed: Feb. 10, 2003

(86) PCT No.: PCT/JP03/01407

§ 371 (c)(1),
(2), (4) Date: Aug. 23, 2004

(87) PCT Pub. No.: WO03/073044

PCT Pub. Date: Sep. 4, 2003

(65) Prior Publication Data

US 2005/0254066 A1 Nov. 17, 2005

(30) Foreign Application Priority Data

Feb. 28, 2002 (JP) ............................. 2002-053144

(51) Int. Cl.
*G01B 11/24* (2006.01)
*G01V 8/00* (2006.01)
*G06K 9/00* (2006.01)

(52) U.S. Cl. ...................... 356/604; 356/613; 356/625; 250/559.22; 382/149

(58) Field of Classification Search .. 356/237.1–237.6, 356/600–625; 250/559.19, 559.22, 559.23, 250/559.24, 237 G, 223 R; 382/100–101, 382/112, 154; 348/42–45
See application file for complete search history.

(56) References Cited

U.S. PATENT DOCUMENTS 5,118,192 A * 6/1992 Chen et al. .................. 356/602

(Continued)

FOREIGN PATENT DOCUMENTS

JP 07-234114 9/1995

(Continued)

*Primary Examiner*—Sang H. Nguyen
(74) *Attorney, Agent, or Firm*—Muramatsu & Associates (57) ABSTRACT

For measuring the three-dimensional shape of an object of measurement using a phase shift method, a three-dimensional shortening the measurement time. A printed state inspection device 1 includes a printed circuit board K printed with cream solder H, an illumination device 3 for illuminating three sine wave light component patterns with different phases on the surface of printed circuit board K, and a CCD camera 4 for picking-up images of the illuminated part of the printed circuit board K. A control device 7 creates a chart representing a relationship between brightness and coordinates for each light component from the image data obtained by the illumination of the light component patterns and determines relative phase angles among the light component patterns, and calculates the height of the cream solder H from the image data and the relative phase angles.

11 Claims, 3 Drawing Sheets

U.S. PATENT DOCUMENTS

| | | | |
|---|---|---|---|
| 5,418,371 A | * | 5/1995 | Aslund et al. ............ 250/458.1 |
| 5,450,204 A | * | 9/1995 | Shigeyama et al. ......... 356/604 |
| 5,581,352 A | * | 12/1996 | Zeien ......................... 356/604 |
| 5,848,188 A | * | 12/1998 | Shibata et al. .............. 382/203 |
| 6,002,423 A | * | 12/1999 | Rappaport et al. ............ 348/42 |
| 6,040,910 A | * | 3/2000 | Wu et al. .................... 356/613 |
| 6,075,605 A | * | 6/2000 | Futamura et al. ........... 356/608 |
| 6,956,963 B2 | * | 10/2005 | Ulrich et al. ................ 382/154 |
| 7,019,848 B2 | * | 3/2006 | Mamiya ...................... 356/601 |

FOREIGN PATENT DOCUMENTS

| | | |
|---|---|---|
| JP | 2001-012917 | 1/2001 |
| JP | 2002-048523 | 2/2002 |

* cited by examiner

THREE-DIMENSIONAL MEASURING INSTRUMENT

FIELD OF THE INVENTION

The present invention relates to a three-dimensional measuring instrument for measuring a three-dimensional shape of a measurement object.

BACKGROUND OF THE INVENTION

Typically, when mounting electronic components on a printed circuit board, cream solder is first printed on a predetermined electrode pattern formed on the printed circuit board. Next, based on the viscosity of the cream solder, the electronic components are temporarily mounted on the printed circuit board. Then, the printed circuit board is transferred to a reflow furnace, where it is soldered through a reflow process. Nowadays, the printed state of the cream solder must be inspected prior to entering the reflow furnace, where a three-dimensional measuring instrument is used for the cream solder inspection.

In recent years, various non-contact type three-dimensional measuring instruments using light have been proposed. One of them is a technology related to a three-dimensional measuring instrument using a phase shift method (Japanese Laid-Open Publication No. 11-211443 and Japanese Patent No. 2711042).

The three-dimensional measuring instrument based on the above technology uses a CCD camera. Namely, by an illuminating means formed of a combination of a light source and a filter with a sine wave pattern, the measuring instrument illuminates a light pattern having a striped light intensity distribution on the object of measurement (in this case, the printed circuit board). Then, it is observed by using a CCD camera placed right above the printed circuit board. In this situation, the light intensity I of a point P on the screen is expressed by the following formula.

$$I = e + f \cos \phi$$

[where, e represents DC current light noise (offset component), f represents sine wave contrast (reflection rate), and $\phi$ represents a phase based on the irregularity of the object]

At this point, by shifting the light pattern, the phase is changed to four steps ($\phi+0$, $\phi+\pi/2$, $\phi+\pi$, $\phi+3\pi/2$), and the images carrying the intensity distribution I0, I1, I2, and I3 corresponding to the four phase steps are retrieved so that positional information $\theta$ is determined by the following formula.

$$\theta = arc \tan\{(I3-I1)/(I0-I2)\}$$

By using this positional information $\theta$, the three-dimensional coordinates (X, Y, Z) of the point P on the printed circuit board (cream solder) is determined so that the three-dimensional shape of the cream solder, in particular, the height thereof, can be measured.

In the three-dimensional measuring instrument based on the above technology, the phase must be changed to four steps to obtain four images carrying the intensity distribution corresponding to each step. In other words, an image retrieval process has to be performed every time when the phase is changed, hence, requiring four image retrieval processes per point. Due to this, a long time is necessary for the image retrieval, which in turn causing a long overall measuring time from start to finish.

The present invention has been made by taking the above situation into consideration, where one of its objects is to provide a three-dimensional measuring instrument which is capable of shortening the measuring time required when measuring the three-dimensional shape of an object.

DISCLOSURE OF THE INVENTION

The three-dimensional measuring instrument of the present invention is characterized in that it is comprised of an illuminating means which is capable of illuminating at least two light component patterns with different wave length and different relative phase relationships and striped light intensity distribution onto a measurement object at the same time, an image retrieval means which is capable of retrieving images of the light reflected from the measurement object illuminated with the light component patterns separately per each light component, and a computing means for calculating at least a height of the measurement object based on at least two image data obtained by retrieving the image of the light reflected from the measurement object by the image retrieval means per each light component and also based on relative phase angles of at least two light component patterns, where the relative phase angles and the at least two image data are determined by at least two light component patterns irradiated by the illuminating means.

According to the present invention, at least two light component patterns are illuminated at the same time by the illuminating means onto the measurement object. Here, each light component pattern has the striped light intensity distribution, wave length components different from one another, as well as relative phase relationships different from one another. Then, the image of the light reflected from the measurement object illuminated with the light component patterns is picked-up by the image retrieval means separately for each light component. Then, based on at least two light component patterns illuminated by the illuminating means, the relative phase angles of at least those two light component patterns are determined. Moreover, in the computing means, the predetermined height of at least the measurement object is calculated based on at least the two image data obtained by the image retrieval means under the different relative phase relationships as well as based on the relative phase angles. Therefore, instead of the conventional technology where an image pick-up process has to be performed every time the relative phase relationship is changed, the image retrieval can be collectively performed for each different relative phase relationship at each light component. Due to this, the time required for illumination of the light as well as retrieving the image data relative to one point can be significantly shortened, thus, the time required for measurement can be dramatically shortened as well. In addition, since the relative phase angles are determined by the illuminated light component patterns, it is unnecessary to know the relative phase angles in advance. Therefore, the relative phase angles do not have to be strictly set in advance, thereby allowing the illuminating means to illuminate the light component patterns without knowing their relative phase angles. As a result, the design and equipment can be simplified. Further, when using the illuminating means where the relative phase angles are determined in advance, the actual relative phase angles of the image-retrieved light component patterns may differ from that of the intended (determined) relative phase angles. On the other hand, according to the above means of the invention, since the height is calculated by using the relative phase angles determined from the light component patterns after the illumination process, a more accurate result can be achieved.

Here, the "at least two image data" noted above can be "at least three image data" instead.

Further, the three-dimensional measuring instrument of the present invention is comprised of an illuminating means which is capable of illuminating at least two light component patterns having different wave length components and different relative phase relationships and striped light intensity distribution at least onto the measurement object as well as a substantially planar surface, an image retrieval means which is capable of separately retrieving images of the lights reflected from at least the measurement object and the substantially planar surface illuminated with at least the light component patterns for each light component, and a computing means for calculating at least a height of the measurement object based on relative phase angles determined by at least two image data obtained by retrieving the image of the light reflected from the substantially planar surface per each light component by the image retrieval means and also based on at least two image data obtained by retrieving the image of the light reflected from the measurement object per each light component by the image retrieval means.

According to the present invention, at least two light component patterns are illuminated at the same time by the illuminating means onto at least the measurement object. Further, at least two light component patterns are illuminated at the same time by the illuminating means onto at least the substantially planar surface. Each light component pattern has the striped light intensity distribution, wave length components different from one another, as well as relative phase relationships different from one another. Then, the images of the lights reflected from the measurement object as well as the substantially planar surface illuminated with the light component patterns are separately retrieved by the image retrieval means for each light component. Here, the substantially planar surface can be a separate object from the measurement object, or a measurement object having such a planar surface. Then, based on at least two image data of the substantially planar surface obtained in the image retrieval means under different relative phase relationships, the relative phase angles are determined. Moreover, in the computing means, the predetermined height of at least the measurement object is calculated based on at least two image data obtained by the image retrieval means under the different relative phase relationships as well as the relative phase angles. Therefore, instead of the conventional technology where an image pick-up process has to be performed every time the relative phase relationship is changed, the image retrieval can be collectively performed for each different relative phase relationship at each light component. Due to this, the time required for illumination of the light as well as retrieving the image data relative to one point can be significantly shortened, thus, the time required for measurement can be dramatically shortened as well. In addition, since the relative phase angles are determined by the illuminated light component patterns, it is unnecessary to know the relative phase angles in advance. Therefore, the relative phase angles do not have to be strictly set in advance, thereby allowing the illuminating means to illuminate the light component patterns without knowing their relative phase angles. As a result, the design and equipment can be simplified. Further, when using the illuminating means where the relative phase angles are determined in advance, the actual relative phase angles of the image-retrieved light component patterns may differ from that of the intended (determined) relative phase angles. On the other hand, according to the above means of the present invention, since the height is calculated by using the relative phase angles determined from the light component patterns after the illumination process, a more accurate result can be achieved. Here, the "at least two image data" noted above can be "at least three image data" instead.

Further, the three-dimensional measuring instrument of the present invention is comprised of an illuminating means which is capable of illuminating at least two light component patterns having different wave length components and different relative phase relationships and striped light intensity distribution onto at least a measurement object as well as a substantially planar surface, an image retrieval means which is capable of separately retrieving images of the lights reflected from at least the measurement object as well as the substantially planar surface illuminated with at least the light component patterns for each light component, and a computing means which is capable of calculating relative phase angles based on at least two image data from the image retrieval means which are derived from images of reflected lights from the substantially planar surface for each light component, where the computing means calculates at least a height of the measurement object based on at least two image data from the image retrieval means which are retrieved from the light reflected from the measurement object for each light component and also based on the relative phase angles.

According to the present invention, at least two light component patterns are illuminated at the same time by the illuminating means onto at least the measurement object. Further, at least two light component patterns are illuminated at the same time by the illuminating means onto at least the substantially planar surface. Each light component pattern has the striped light intensity distribution, wave length components different from one another, as well as relative phase relationships different from one another. Then, images of the lights reflected from the measurement object as well as the substantially planar surface illuminated with the light component patterns are separately retrieved by the image retrieval means for each light component. Here, the planar surface can be a separate object, or a measurement object having such a planar surface. Then, based on at least two image data of the substantially planar surface obtained in the image retrieval means under different relative phase relationships, the relative phase angles are determined. Moreover, in the computing means, the predetermined height of at least the measurement object is calculated based on at least two image data obtained by the image retrieval means under the different relative phase relationships as well as the relative phase angles. Therefore, instead of the conventional technology where an image pick-up process has to be performed every time the relative phase relationship is changed; the image retrieval can be collectively performed for each different relative phase relationship at each light component. Due to this, the time required for illumination of the light as well as retrieving the image data relative to one point can be significantly shortened, thus, the time required for measurement can be dramatically shortened as well. In addition, since the relative phase angles can be calculated during the computing process, it is unnecessary to know the relative phase angles in advance. Therefore, the relative phase angles do not have to be strictly set in advance, thereby allowing the illuminating means to illuminate the light component patterns without knowing their relative phase angles. As a result, the design and equipment can be simplified. Further, when using the illuminating means where the relative phase angles are determined in advance, the actual relative phase angles of the image-retrieved light component patterns may differ from that of the intended (determined) relative phase angles. On the other hand, according to the above means of the present invention, since the height is calculated by calculating the relative phase angles from the image data, a more accurate result can be achieved. Here, the "at least two image data" noted above can be "at least three image data" instead.

Further, the three-dimensional measuring instrument of the present invention is comprised of an illuminating means which is capable of illuminating at least three light component patterns having different wave length components and different relative phase relationships and a striped sine wave light intensity distribution at least onto a measurement object as well as a substantially planar surface, an image retrieval means which is capable of separately retrieving images of the lights reflected from at least the measurement object and the substantially planar surface illuminated with at least the light component patterns for each light component, and a computing means which is capable of calculating relative phase angles based on at least three image data from the image retrieval means which are derived from images of reflected lights from the substantially planar surface for each light component, where the computing means calculates, through a phase shift method, at least a height of the measurement object based on at least three image data from the image retrieval means which are retrieved from the light reflected from the measurement object for each light component and also based on the relative phase angles.

According to the present invention, at least two light component patterns are illuminated at the same time by the illuminating means onto at least the measurement object. Further, at least two light component patterns are illuminated at the same time by the illuminating means onto at least the substantially planar surface. Each light component pattern has a striped sine wave light intensity distribution, wave length components different from one another, as well as relative phase relationships different from one another. Then, images of the lights reflected from the measurement object as well as the substantially planar surface illuminated with the light component patterns are separately retrieved by the image retrieval means for each light component. Here, the planar surface can be a separate object from the measurement object, or a measurement object comprised of such a planar surface. Then, based on at least three image data of the substantially planar surface obtained by the image retrieval means under different relative phase relationships, the relative phase angles are determined. Moreover, the predetermined height of at least the measurement object is calculated by the phase shift method based on at least three image data obtained by the image retrieval means under the different relative phase relationships as well as based on the relative phase angles. Therefore, instead of the conventional technology where an image pick-up process has to be performed every time the relative phase relationship is changed, the image retrieval can be collectively performed for each different relative phase relationship at each light component. Due to this, the time required for illumination of the light as well as retrieving the image data relative to one point can be significantly shortened, thus, the time required for measurement can be dramatically shortened as well. In addition, since the relative phase angles can be calculated during the computing process, it is unnecessary to know the relative phase angles in advance. Therefore, the relative phase angles do not have to be strictly set in advance, thereby allowing the illuminating means to illuminate the light component patterns without knowing their relative phase angles. As a result, the design and equipment can be simplified. Further, when using the illuminating means where the relative phase angles are determined in advance, the actual relative phase angles of the image-retrieved light component patterns may differ from that of the intended (determined) relative phase angles. On the other hand, according to the above means of the present invention, since the height is calculated by using the relative phase angles determined from the light component patterns after the illumination process, a more accurate result can be achieved.

Further, it is preferable that the measurement object is image picked-up by the image retrieval means and its height is calculated by the computing means after the substantially planar surface is image picked-up by the image retrieval means and the relative phase angles are calculated by the computing means.

In this case, the substantially planar surface is image picked-up by the image retrieval means and the relative phase angles are calculated by the computing means in advance. Since the relative phase angles are already known, the image of the substantially planar surface does not have to be retrieved and the relative phase angles do not have to be calculated every time. Therefore, when calculating the height of the measurement object, it can be calculated by retrieving the image of only the measurement object, thereby improving the processing speed.

Further, the computing means preferably charts the relationship between the brightness and the location of the lines crossing the stripes illuminated onto the substantially planar surface and calculates the relative phase angles based on the charted data per each image data.

In this case, the charted relationship between the brightness and the location of the lines crossing the stripes illuminated onto the substantially planar surface per each image data in the computing means is obtained. This chart is comprised of sine waves. The relative phase angles of the light component patterns can be easily and accurately calculated by only comparing each chart.

Further, the computing means preferably calculates the relative phase angles per each image data based on the change in brightness of the lines crossing the stripes illuminated onto the substantially planar surface.

In this case, the data of the relationship between the brightness and the location of the lines crossing the stripes illuminated onto the substantially planar surface per each image data in the computing means is obtained. The relative phase angles of the light component patterns can be easily and accurately calculated by only comparing each data.

Further, the lines crossing the stripes are preferably perpendicular to the stripes.

In this case, the data of the relationship between the brightness and the location of the lines crossing the stripes in the perpendicular manner is obtained. This data precisely shows the changes of the brightness of the light component patterns, thereby allowing an easy and accurate calculation of the relative phase angles. As a result, an accurate result can be obtained.

Further, the computing means preferably calculates each relative phase angle for several of the above mentioned lines to determine an optimum relative phase angle.

By the computing means, each relative phase angle for each of several lines is calculated. When calculating a relative phase angle from one line, an abnormal data may be picked up as the relative phase angle. On the contrary, an optimum relative phase angle is determined from several relative phase angles, thus, abnormal data or error elements can be eliminated. As a result, the height can be calculated upon calculating an accurate relative phase angle, obtaining a more accurate result.

Further, the measurement object is preferably includes a planar surface and the above noted substantially planar surface is preferably a part of the measurement object.

Since the planar surface is included in the measurement object, it does not have to be image retrieved separately to calculate the relative phase angle, thus, enabling only the image data of the measurement object to be obtained. Therefore, the processing speed is increased.

Further, the above noted substantially planar surface is preferably established on an object other than the measurement object.

When the substantially planar surface is on an object other than the measurement object, it can be calculated without being affected by the irregularity of the surface of the measurement object, thereby enabling to obtain a more accurate result. Moreover, this is valid for a measurement object without having a planar surface.

Further, the image retrieval means can preferably obtain the image data of the measurement object and the substantially planar surface through only one image retrieval process.

In this case, the substantially planar surface does not have to be image retrieved in order to calculate the relative phase angles of the light component patterns. Therefore, the time required for image pick-up can be significantly shortened, thereby allowing the time required for measurement to be dramatically shortened as well.

Further, the measurement object is cream solder printed on a printed circuit board, and it is preferable to have a judging means for determining the quality of the printed state based on the height of the cream solder.

In this case, the height of the cream solder printed on the printed circuit board is measured, where the pass/fail of the cream solder is determined based on that measured value. Therefore, each of the above effects is exhibited during the measurement of the cream solder, which enables to determine the pass/fail of the cream solder accurately.

Further, the measurement object is a solder bump mounted on the printed circuit board, and it is preferable to have a judging means for determining the pass/fail of the shape of the solder bump based on the height of the solder bump.

In this case, the height of the solder bump mounted on the printed circuit board is measured, where the pass/fail is determined based on that measured value. Therefore, each of the above effects is exhibited during the measurement of the solder bump, which enables to determine the pass/fail of the solder bump accurately.

BEST MODES FOR IMPLEMENTING THE INVENTION

Figure 1:
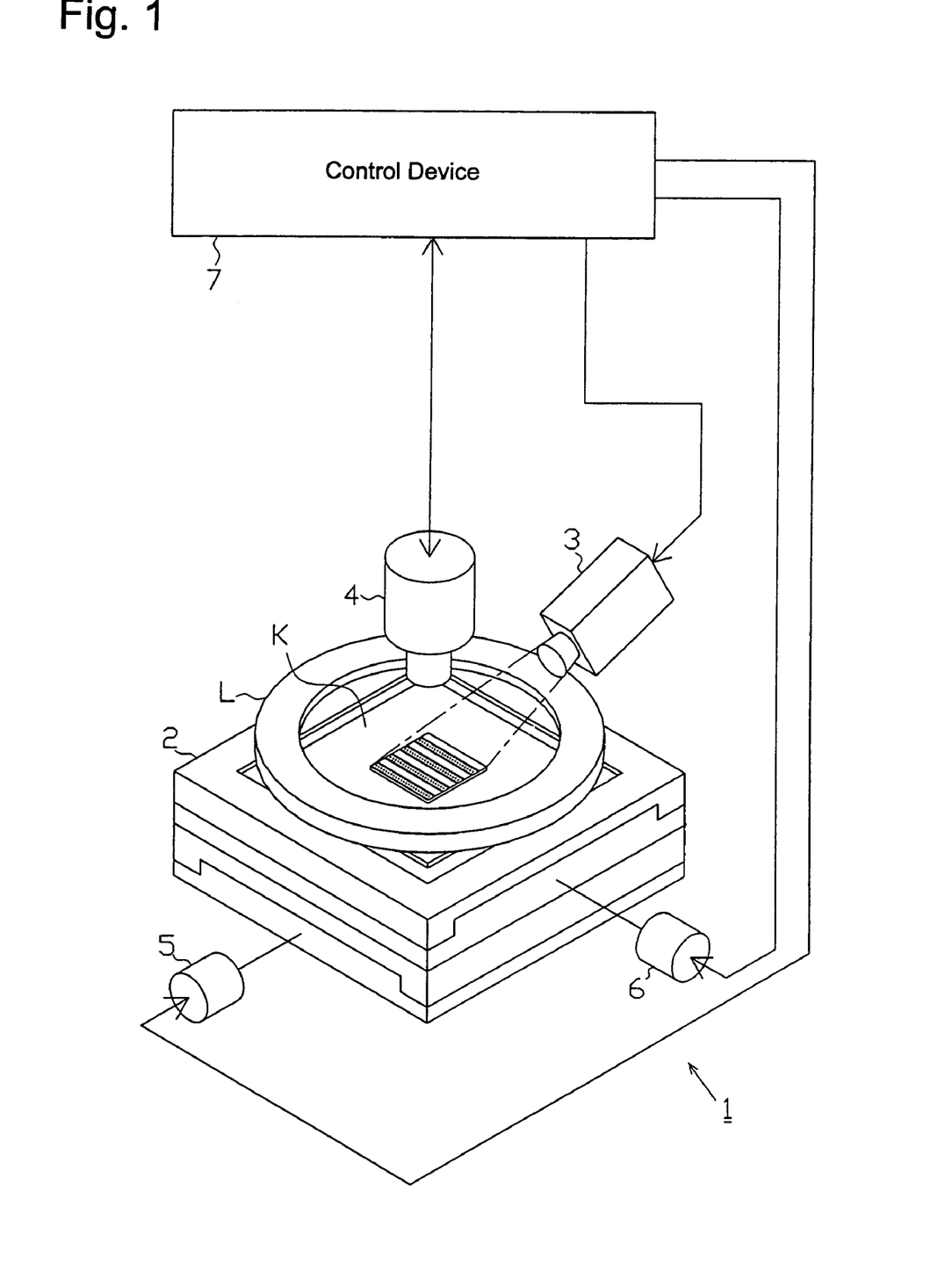
FIG. 1 is a schematic perspective view showing a typical structure of a printed state inspection device incorporating a three-dimensional measuring instrument in an embodiment of the present invention.

The embodiments of the present invention will be explained below with reference to the accompanying drawings. FIG. 1 is a schematic structural view showing the printed state inspection device 1 furnished with the three-dimensional measuring instrument in the embodiment of the present invention. As shown in FIG. 1, the printed state inspection device 1 is comprised of a table 2 for placing a printed circuit board K printed with cream solder H as an object of measurement, an illumination device 3 provided with the illuminating means for illuminating a predetermined light component pattern from above in a diagonal direction towards the surface of printed circuit board K, a CCD camera 4 provided with an image retrieval means for obtaining images of the illuminated part on the printed circuit board K, and a laser pointer (not shown) for measuring a standard height. The cream solder H in this example is printed on the electrode pattern made of copper films established on the planar printed circuit board K.

Motors 5 and 6 are established on the table 2, and the printed circuit board K placed on the table 2 is slidably movable in a desired direction (X-axis and Y-axis directions) by the motors 5 and 6.

Figure 2:
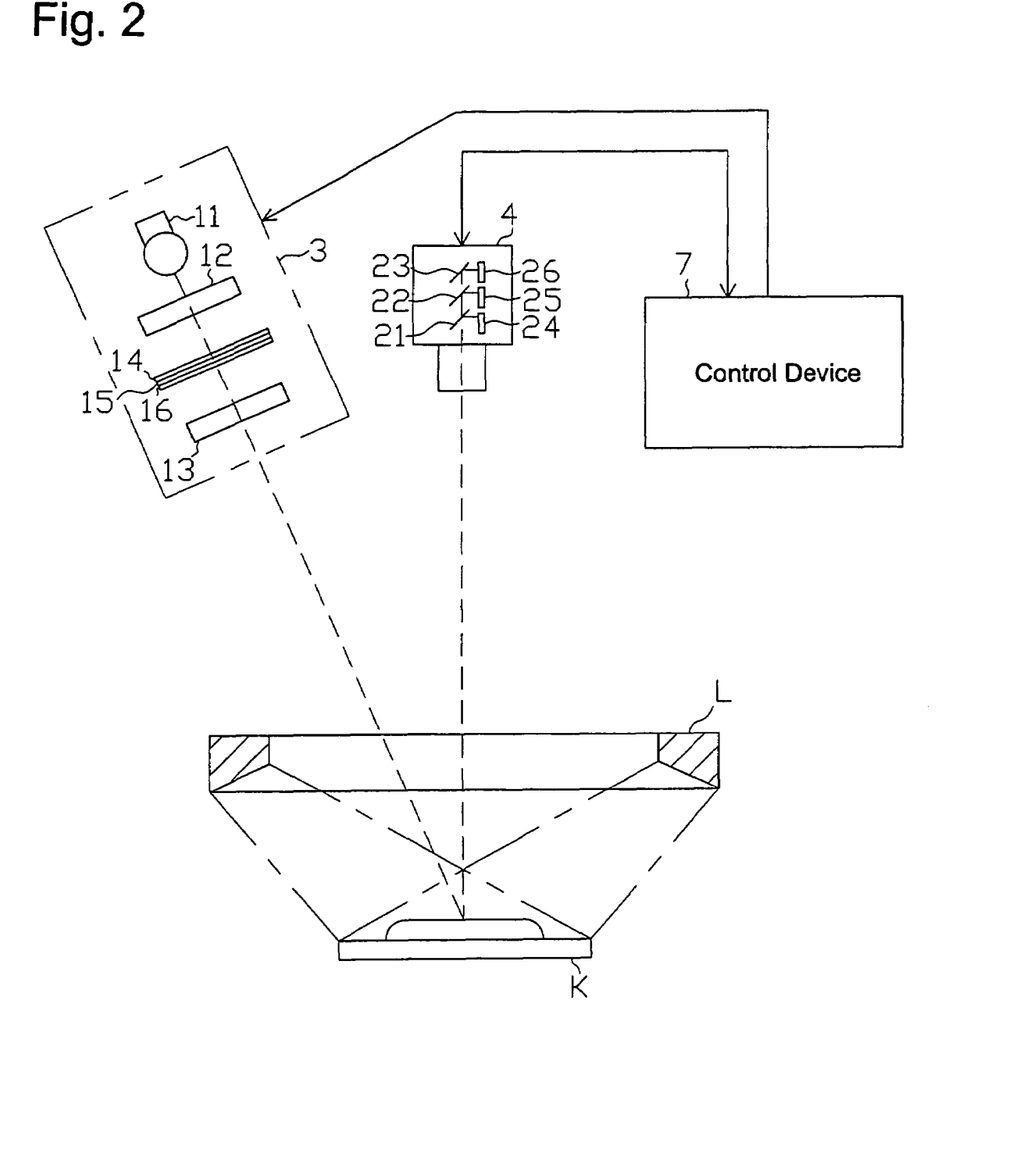
FIG. 2 is a schematic diagram showing a more detailed structure of the three-dimensional measuring instrument in the embodiment.

The illumination device 3 of the present invention illuminates light component patterns of red, green, and blue each having a different phase from one another. More specifically, as shown in FIG. 2, the illumination device 3 includes a light source 11, a condensing lens 12 for condensing the light from the light source 11, an illuminating lens 13, and red, green, and blue filter striped plates 14, 15, and 16 placed between the condensing lens 12 and the illuminating lens 13. The degree of red color of the red filter striped plate 14 changes in the sine wave form (striped) corresponding to the locations thereon. The red filter striped plate 14 allows only the red components to pass through in a striped form and allows all the lights of other wave length bands to pass through. Further, the degree of the green color of the green filter striped plate 15 changes in the sine wave form (striped) corresponding to the locations thereon. The green filter striped plate 15 allows only the green components to pass through in a striped form and allows all the lights of other wave length bands to pass through. However, the phase of the sine wave is shifted in comparison to the red filter striped plate 14. In addition, the degree of the blue color of the blue filter striped plate 16 changes in the sine wave form (striped) corresponding to the locations thereon. The blue filter striped plate 16 allows only the blue components to pass through in a striped form and allows all the lights of other wave length bands to pass through. However, the phase of the sine wave is shifted in comparison to the red and green filter striped plates 14, 15. In other words, these red, green, and blue filter striped plates 14, 15, and 16 are overlapped together in a condition where each phase is shifted from one another (of course, it is also possible that they are mutually separated from one another).

The light emitted from the light source 11 is illuminated (irradiated) onto the printed circuit board K through the condensing lens 12, the colored filter striped plates 14, 15, 16, and the illuminating lens 13 as striped light component patterns.

Further, the CCD camera 4 noted above is composed of a first, second, and third dichroic mirror 21, 22, 23 as well as a first, second, and third image pick-up members 24, 25, 26 corresponding to the dichroic mirrors. Namely, the first dichroic mirror 21 reflects the light within a predetermined wave length band (corresponding to the red light) and allows the other lights to pass through. The first image pick-up member 24 retrieves the image of the reflected light from the mirror 21. Further, the second dichroic mirror 22 reflects the light within a predetermined wave length band (corresponding to the green light) and allows the other lights to pass through. The second image pick-up member 25 retrieves the image of the reflected light from the mirror 22. Moreover, the third dichroic mirror 23 (a regular mirror can be used) reflects the light within a predetermined wave length band (corresponding to the blue light) and allows the other lights to pass through. The third image pick-up member 26 retrieves the image of the reflected light from the mirror 23.

In the present embodiment, as shown in FIGS. 1 and 2, a control device 7 is provided for controlling the operations of the CCD camera 4, the illumination device 3, and the motors 5 and 6, as well as conducting various calculations based on the image data retrieved by the CCD camera 4. Namely, when the printed circuit board K is placed on the table 2, the control device 7 controls the motors 5 and 6 to move to a predetermined position, thereby transferring the printed circuit board K to an initial position. This initial position is, for example, one of the positions corresponding to the pre-divided surface of the printed circuit board K where the surface is divided based on a unit of the visual field of the CCD camera 4.

Further, the control device 7 controls the illumination device 3 to start the illumination of the light component pattern. In this process, since a plurality of wave length bands where the phases are different from one another are included in the light component pattern, the phases do not have to be shifted during the time passage as was required in the conventional technology. Moreover, during the illumination process where the light component patterns whose phases are shifted are irradiated at the same time, the control device 7 controls the operation of the CCD camera 4 so that the images of the inspection area are picked-up per each of the wave length bands (by the image pick-up member 24-26), thereby obtaining the image data of three screens.

Further, the laser pointer is operated for determining a standard height for obtaining the height of the cream solder H. The height of the non-solder area (planar surface) not printed with cream solder H of the printed circuit board K is measured as the standard height of the inspected area. The non-solder area has a planar surface, thus, the height can be easily measured by the laser pointer.

The control device 7 is comprised of an image memory, which sequentially stores the image data. Based on the stored image data, the control device 7 conducts various image processing. During the image processing, the control device 7 controls the operation of the motors 5 and 6 to move the table 2 to the next inspection area. The control device 7 stores the image data retrieved in the manner noted above in the image memory. On the other hand, when the image processing in the image memory is completed, the control device 7 can immediately conduct the next image processing since the next image data is already acquired in the image memory. In other words, the inspection is conducted by transferring the next inspection area (m+1) and retrieving the image data, and at the same time, performing the image processing for the $m^{th}$ image data and image comparison. Such parallel processing noted above is repeated until the inspection for the all of the inspection areas is completed. As in the foregoing, in the printed state inspection device 1 of the present invention, the control device 7 controls to shift the inspection area while sequentially conducting the image processing so that the printed state of the cream solder H on the printed circuit board K can be quickly and accurately inspected.

Figure 3:
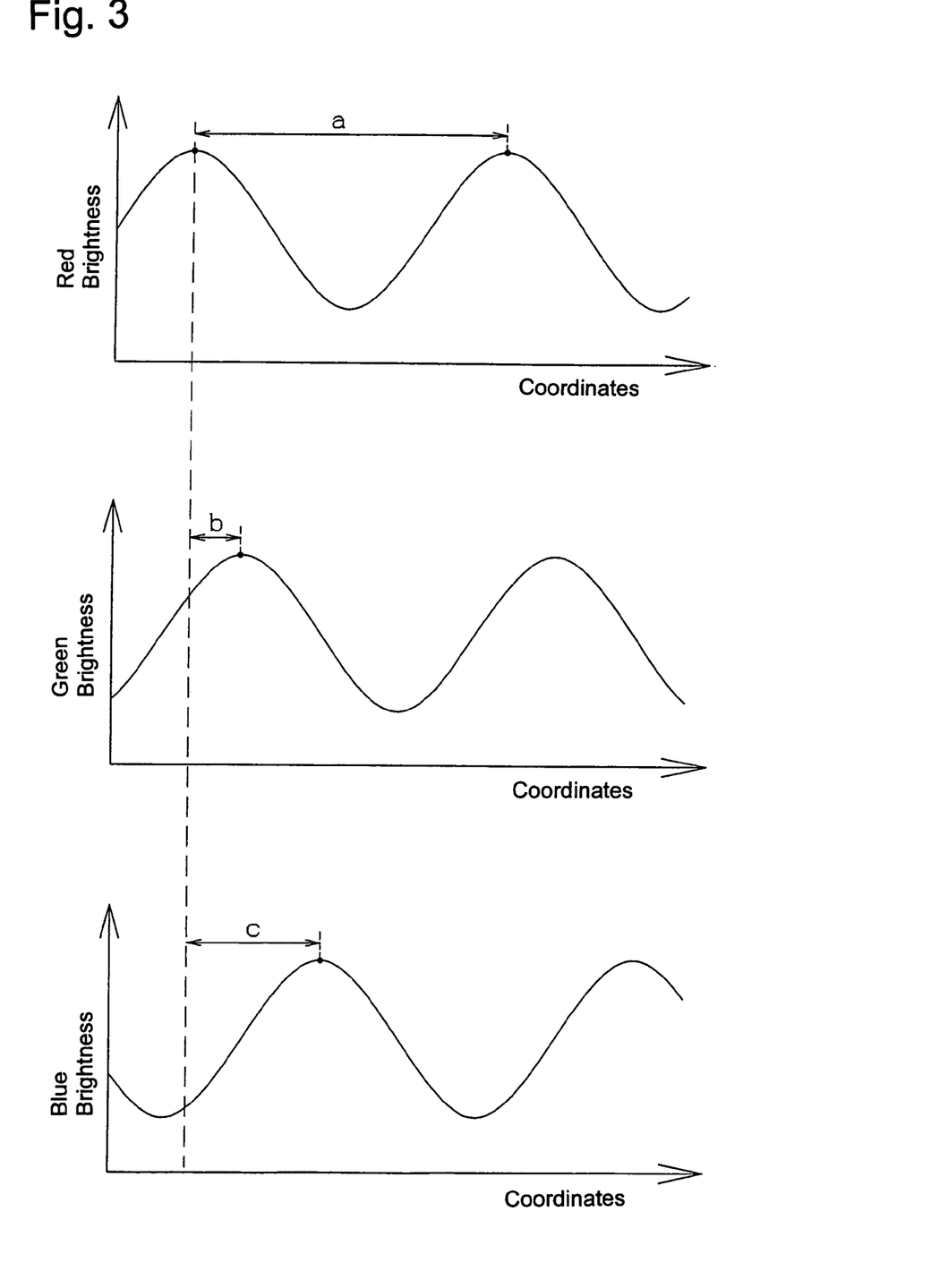
FIG. 3 is a graph showing an example of the relationship between the coordinates and the brightness of the red, green, and blue light component patterns with relative phase relationships different from one another.

Next, the image process, an arithmetic process, as well as a comparison process conducted by the control device 7 will be explained. First, based on the image data of three screens, the relative phase angle of each retrieved light component pattern is calculated. The relative phase angle of each light component pattern is calculated from a brightness chart of the light component pattern. Namely, the control device 7 creates a chart showing the relationship between the brightness and the coordinates of the predetermined lines perpendicular to the stripes of the light component pattern of the non-solder area per each light component pattern. As a result, charts of red, green, and blue colors as shown in FIG. 3 can be achieved.

These three charts have the same time period. Based on either one of the charts (the red chart, for example), a distance between the tops (vertex) of the charts, a coordinate distance a of one time period is calculated. Next, in order to calculate a first relative phase angle $\alpha$, which is a phase difference between the red and green light component patterns, a coordinate distance b, which is a difference between the top of the green chart and the top of the red chart, is calculated. Then, the first relative phase angle $\alpha$ is calculated by the following formula (2a).

$$\alpha = 360 \times b/a \tag{2a}$$

where, $\alpha$ is a frequency unit.

Similarly, a coordinate distance c, which is a difference between the top of the red chart and the top of the blue chart, is calculated. Then, a second relative phase angle $\beta$, which is a phase shift between the red and blue light component patterns, is calculated by the following formula (2b).

$$\beta = 360 \times c/a \tag{2b}$$

Next, the control device 7 calculates the height within the inspection area by using the image data of three screens. A phase shift is created based on the difference in the height with respect to the light component pattern projected on the inspection area. Then, the control device 7 calculates the height of the reflection surface of the inspection area based on the principle of the phase shift method (striped inspection method) with use of the image data for each wave length band where the phases of the light component pattern are different.

Namely, the brightness of the point P on each screen can be expressed by the formula representing each of the sine waves. The brightness V0, V1, and V2 of the point P on each screen, where the amplitude and offset components of each red, green, and blue formula are normalized, can be expressed by the following formula.

$$V0 = A \sin\theta + B \tag{2c}$$

$$V1 = A \sin(\theta + \alpha) + B \tag{2d}$$

$$V2 = A \sin(\theta + \beta) + B \tag{2e}$$

where, $\theta$ represents positional information for obtaining the height, A represents an amplitude, and B represents an offset component.

By these formulas (2c)-(2e), the following formula (2f) are evolved.

$$\tan\theta = \frac{(V1-V2)\sin\beta + (V0-V2)(\sin\alpha - \sin\beta)}{(V1-V2)(1-\cos\beta) - (V0-V2)(\cos\alpha - \cos\beta)} \quad (2f)$$

$$\tan\theta = \frac{(V0-V2)\sin\alpha + (-V0+V1)\sin\beta}{(V1-V2) + (-V0+V2)\cos\alpha + (V0-V1)\cos\beta}$$

Based on the formula (2f), positional information θ is calculated by inputting the phase angles α and β which are already calculated, as well as the already measured brightness V0, V1, and V2.

By using the calculated positional information θ obtained in the foregoing manner, a height Z of the point P in the solder area is determined based on the formula below.

Here, when an angle formed by the lead line of the illumination device 3 and the illuminated beam from the illumination device 3 to the point P is represented by ε, the angle ε can be expressed by the following formula (3).

$$\epsilon = f(\theta + 2n\pi) \quad (3)$$

Then, the height Z is evolved with respect to the following formula (4).

$$Z = Lp - Lpc/\tan\epsilon + Xp/\tan\epsilon \quad (4)$$

where, Lp represents a height from the standard surface of the illumination device 3, Lpc represents a distance in the X-axis direction between the CCD camera 4 and the illumination device 3, and Xp represents the X coordinate of the point P.

The height data of the point P obtained in such a way is calculated by the unit of each pixel P of the retrieved image screen, and is stored in the memory of the control device 7. Moreover, based on the data of each unit, the amount of the printed cream solder H is calculated by integrating the height of each point within the inspection area. Then, the data such as the position, area, height, and amount of cream solder H determined in this manner is compared with the standard data stored in advance, where the pass/fail of the printed state of the cream solder H in the inspection area is determined by finding out whether the result of the comparison is within the tolerance range or not.

As explained above, according to the embodiment of the present invention, the height of the cream solder H is calculated based on the image data of three screens conducted by the CCD camera 4 under the different relative phase relationships. Therefore, unlike the conventional technology where an image pick-up process had to be conducted every time when the relative phase relationship is changed, the image retrieval in the present invention can be conducted at the same time for each light component with different relative phase relationship. As a consequence, one illumination process as well as one image pick-up process can be conducted per point, which significantly reduces the time required for the illumination and the image pick-up, thereby dramatically shortening the time required for the measurement.

Moreover, since the height of the cream solder H can be determined based on the three image data, the total amount of data becomes smaller in comparison to the conventional technology where the calculation was conducted based on four image data. Therefore, the calculation time is significantly shortened.

In particular, in the present invention, the positional information θ can be determined based on formulas not very complicated, and the height can be calculated based on the positional information θ obtained by the formulas. As a result, a delay that would be resulted from complicated calculations can be avoided, thereby securely achieving the effects of the present invention.

Further, when the first and second relative phase angles α and β are not calculated, the phase shift of the filter striped plates 14, 15, and 16 must be obtained in advance. In other words, the relative phase angles α and β for filter striped plates 14, 15, and 16 must be strictly determined in advance. In addition, when the relative phase angles α and β cannot be determined in advance or the filter striped plates with unknown relative phase angles α and β are used, the height cannot be calculated. On the other hand, according to the present invention, since the relative phase angles α and β can be calculated from the image data, those angles do not have to be determined in advance. Therefore, the relative phase angles α and β do not have to be strictly determined in advance. Also, filter striped plates with unknown relative phase angles α and β can be used. As a result, the design can be simplified.

Further, when using the filter striped plates where the relative phase angles thereof are already determined, the actual relative phase angles of the light component patterns in the retrieved image may differ from the intended (determined) relative phase angles due to reasons such as not having ideal pigments. On the other hand, according to the present invention, the height is calculated after calculating the relative phase angles from the image data, thereby achieving a more accurate result.

The embodiment of the present invention is not limited to the context explained above, and thus, can also be implemented in the following manners.

(a) In the above embodiment, the relative phase angles α and β are calculated from the image data where the image of the inspection area is retrieved, however, the relative phase angles α and β can also be calculated from image data of a separate planar surface retrieved in advance.

(b) When calculating the relative phase angles α and β, a predetermined line, i.e., one line is used, however, the phase data can be calculated per each line for several lines and determine the relative phase angles α and β based on the average values. In this case, a more accurate relative phase angles α and β can be calculated. Moreover, by obtaining several phase data, an abnormal value within the phase data can be detected and deleted.

(c) In the above embodiment, the relative phase angles α and β are calculated from the difference in distance between the tops of the charts. However, the method of computing the relative phase angles is not limited to this particular calculation method. For example, the center line of the amplitude can be calculated from the top and bottom of each chart to calculate the relative phase angles from the difference in the distance between the center line of each chart.

(d) The light illuminated by the illumination device 3 is not particularly limited to a sine wave as long as the light components with different phases can be illuminated in a striped manner. Moreover, the wave length band is not limited to red, green, and blue as mentioned in the above embodiment, and can be a separate wave length band as long as it is capable of separately retrieving the image per each wave length band. Further, the light components need not be limited to three, but two or more than four light components can be illuminated.

(e) Further, the filter striped plate is not limited to the one mentioned in the above embodiment as long as the wave length stripe with a plurality of different phases can be illuminated. For example, only one filter striped plate can be used.

(f) In the above embodiment, the case of measuring the height of the cream solder H printed on the printed circuit board K has been described in detail. However, the present invention can be implemented for the case of measuring the height of the cream solder printed on an IC package (such as leads) as well. Moreover, the present invention can be implemented for the case of measuring the height of other measurement objects as well. Such other measurement objects include a printed product where print is formed on a substrate or a layered body.

(g) In the above embodiment, the height is calculated by using a phase shift method, however, the phase shift method does not always have to be used. For example, a non-sine wave striped light component pattern can be illuminated and image data is retrieved, where the height is calculated based on that image data.

What is claimed is:

1. A three-dimensional measuring instrument, comprising:
    an illuminating means having a striped light intensity distribution for simultaneously illuminating at least two light component patterns with different wave length components and different relative phase relationships onto at least a measurement object and a substantially planar surface;
    an image retrieval means which retrieves images of reflected lights from the measurement object and the substantially planar surface illuminated with the light component patterns separately for each light component; and
    a computing means which calculates relative phase angles among the light component patterns based on at least two image data from the image retrieval means which are derived from images of reflected lights from the substantially planar surface for each light component, where the computing means calculates at least a height of the measurement object based on at least two image data from the image retrieval means which are retrieved from the light reflected from the measurement object for each light component and also based on said relative phase angles, a relationship between the brightness and locations of lines crossing the stripes illuminated onto the substantially planar surface is formulated in a chart and the relative phase angler are calculated based on data retrieved from the chart.

2. A three-dimensional measuring instrument as defined in claim 1, wherein the image of the measurement object is retrieved by the image retrieval means and the height of the measurement object is calculated by the computing means after the image of the substantially planar surface is retrieved by the image retrieval means and the relative phase angles are calculated by the computing means.

3. A three-dimensional measuring instrument as defined in claim 1, wherein the lines crossing the stripes are perpendicular to the stripes.

4. A three-dimensional measuring instrument as defined in claim 1, wherein the computing means calculates each relative phase angle for each of a plurality of the lines to determine an optimum relative phase angle.

5. A three-dimensional measuring instrument as defined in claim 1, wherein said substantially planar surface is a planar surface on the measurement object.

6. A three-dimensional measuring instrument as defined in claim 1, wherein said substantially planar surface is a planar surface established on other than the measurement object.

7. A three-dimensional measuring instrument as defined in claim 1, wherein the image retrieval means retrieves the image data of the measurement object as well as the substantially planar surface at the same time in one step.

8. A three-dimensional measuring instrument as defined in claim 1, wherein the measurement object is cream solder printed on a printed circuit board, and a judging means is provided for determining pass/fail of a printed state of the cream solder based on the height of the cream solder.

9. A three-dimensional measuring instrument as defined in claim 1, wherein the measurement object is a solder bump established on a printed circuit board, and a judging means is provided for determining pass/fail of a shape of the solder bump based on the height of the solder bump.

10. A three-dimensional measuring instrument, comprising:
    an illuminating means having a sine wave striped light intensity distribution for simultaneously illuminating at least three light component patterns with different wave length components and different relative phase relationships onto at least a measurement object and a substantially planar surface;
    an image retrieval means which retrieves images of reflected lights from the measurement object and the substantially planar surface illuminated with the light component patterns separately for each light component; and
    a computing means which calculates relative phase angles among the light component patterns based on at least three image data from the image retrieval means which are derived from images of reflected lights from the substantially planar surface for each light component, where the computing means calculates, through a phase shift method, at least a height of the measurement object based on at least three image data from the image retrieval means which are retrieved from the light reflected from the measurement object for each light component and also based on said relative phase angles, wherein the computing means calculates the relative phase angle based on changes in brightness of lines crossing the stripes illuminated on the substantially planar surface.

11. A three-dimensional measuring instrument, comprising:
    an illuminating means having a striped light intensity distribution for simultaneously illuminating at least two light component patterns with different wave length components and different relative phase relationships onto at least a measurement object and a substantially planar surface;
    an image retrieval means which retrieves images of reflected lights from the measurement object and the substantially planar surface illuminated with the light component patterns separately for each light component; and
    a computing means which calculates relative phase angles among the light component patterns based on at least two image data from the image retrieval means which are derived from images of reflected lights from the substantially planar surface for each light component, where the computing means calculates at least a height of the measurement object based on at least two image data from the image retrieval means which are retrieved from the light reflected from the measurement object for each light component and also based on said relative phase angles, wherein the computing means calculates the relative chase angle based on chances in brightness of lines crossing the stripes illuminated on the substantially planar surface.

* * * * *